(12) United States Patent
Brown

(10) Patent No.: US 9,706,361 B1
(45) Date of Patent: Jul. 11, 2017

(54) SYSTEM FOR DETERMINING THE LOCATION OF A MOBILE DEVICE RELATIVE TO OTHER MOBILE DEVICES

(71) Applicant: Jannsen Brown, Allen, TX (US)

(72) Inventor: Jannsen Brown, Allen, TX (US)

( * ) Notice: Subject to any disclaimer, the term of this patent is extended or adjusted under 35 U.S.C. 154(b) by 0 days.

(21) Appl. No.: 15/188,614

(22) Filed: Jun. 21, 2016

Related U.S. Application Data

(60) Provisional application No. 62/183,064, filed on Jun. 22, 2015.

(51) Int. Cl.
| | |
|---|---|
| *H04B 7/00* | (2006.01) |
| *H04W 4/02* | (2009.01) |
| *H04W 4/04* | (2009.01) |
| *H04B 7/08* | (2006.01) |
| *H04B 17/02* | (2006.01) |
| *H04W 24/00* | (2009.01) |

(52) U.S. Cl.
CPC ........... *H04W 4/023* (2013.01); *H04W 4/046* (2013.01)

(58) Field of Classification Search
CPC ............. H04M 1/6041; H04M 1/6058; H04M 1/6066; H04M 1/6075; H04M 1/6083; H04M 1/6091; G01S 13/878; H04B 7/028; H04B 7/0408; H04W 4/02; H04W 64/00
USPC ....................................... 455/569.1
See application file for complete search history.

(56) References Cited

U.S. PATENT DOCUMENTS 8,812,065 B2 * 8/2014 Miller ................. H04M 1/6075
340/995.13

* cited by examiner

*Primary Examiner* — Huy C Ho
(74) *Attorney, Agent, or Firm* — Eldredge Law Firm; Richard G. Eldredge

(57) ABSTRACT

A method to determine the driver of a vehicle having a left hand steering wheel, the method includes providing a first cell phone with a first transceiver to a first user; providing a second cell phone with a second transceiver to a second user; emitting a first multidirectional signal having four defined quadrants within a predetermined distance with the first cell phone via the first transceiver; emitting a second multidirectional signal having four defined quadrants within a predetermined distance with the second cell phone via the second transceiver; determining which quadrant overlaps from the first multidirectional signal and the second multidirectional signal; and determining a driver based upon which quadrant overlaps.

1 Claim, 3 Drawing Sheets

SYSTEM FOR DETERMINING THE LOCATION OF A MOBILE DEVICE RELATIVE TO OTHER MOBILE DEVICES

BACKGROUND

1. Field of the Invention

The present invention relates generally to a system for determining the location of a cellphone relative to other cellphones, and more specifically, to a system identifying whether a cellphone belongs to the driver of a vehicle.

2. Description of Related Art

Conventional systems for determining whether a cellphone user is driving rely on GPS and accelerometers to identify if the user is moving faster than an ambulatory speed. FIG. 1 demonstrates a flowchart 101 with the following steps: cellphone accelerometer determines speed of the cell user 103, if the speed exceeds defined limit, cell phone app shut off phone capabilities 105. A problem commonly associated with using accelerometers to determine if a cell user is driving is that there is no way to determine whether the user is driving or even the type of vehicle such bus or train.

Although great strides have been made in the area of systems for determining whether a cellphone user is driving, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
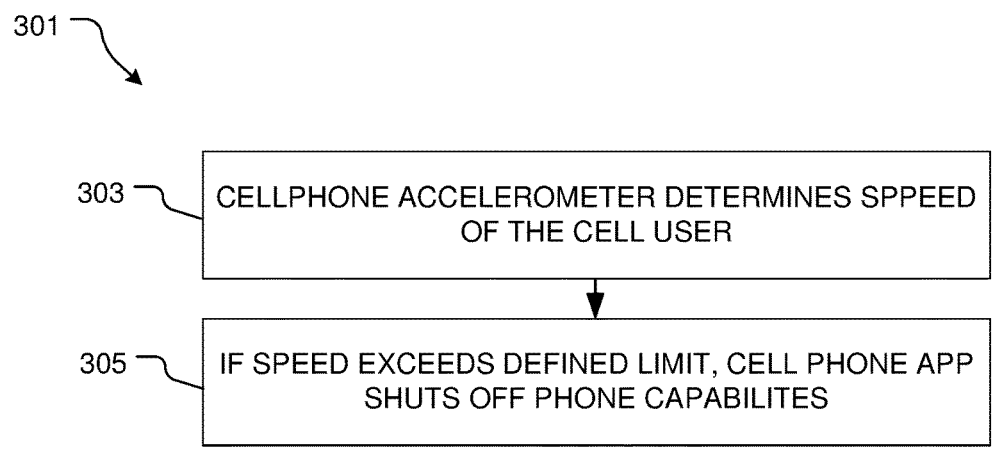
FIG. 1 is a simplified flowchart illustrating a method of use of a conventional mobile application that disables texting.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional system for determining the location of a cellphone relative to other cellphones. Specifically, the system and method of the present application provide effective means to identifying whether a cellphone belongs to the driver of a vehicle and thereafter disabling his/her phone functionality. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
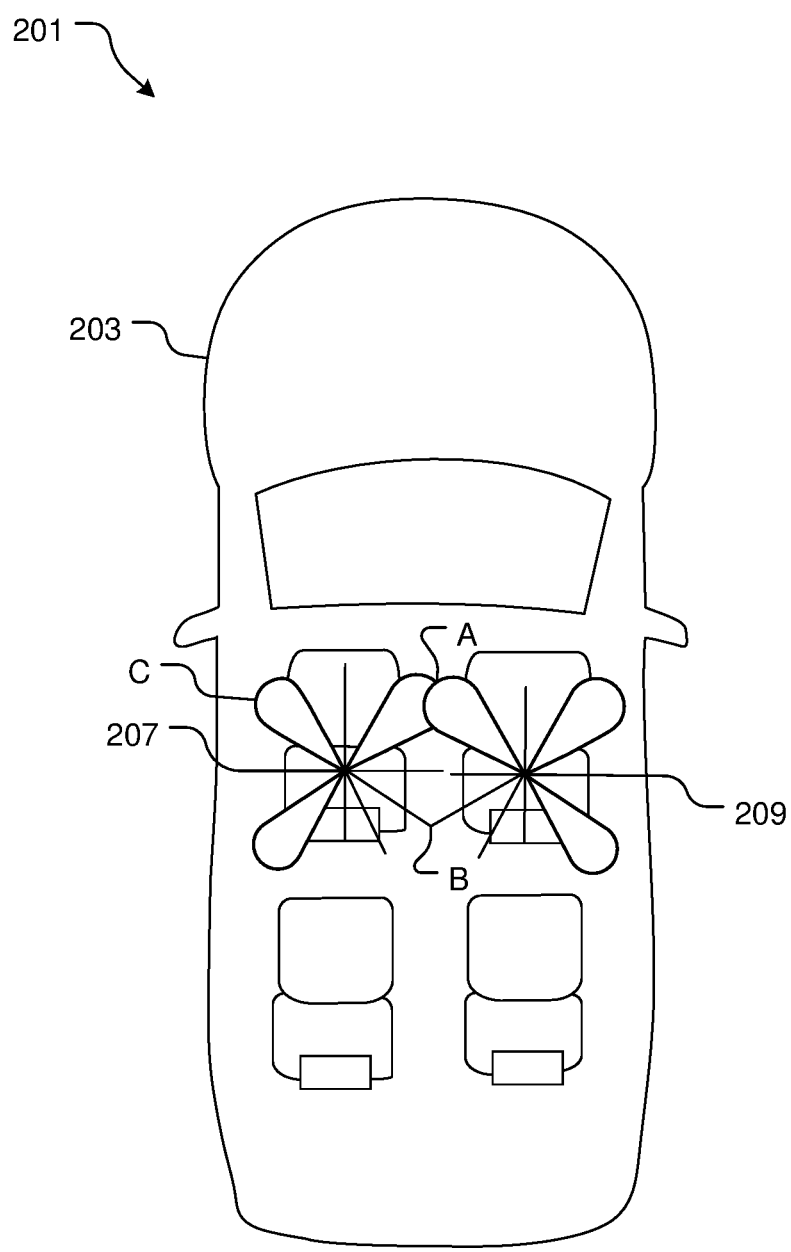
FIG. 2 is a top view of a vehicle defining the location of the driver in accordance with a preferred embodiment of the present technology.

Referring now to the drawings wherein like reference characters identify corresponding or similar elements throughout the several views, FIG. 2 depicts a top view of a vehicle system 201 in accordance with a preferred embodiment of the present technology. It will be appreciated that system 201 overcomes one of more of the above-listed problems commonly associated with conventional systems for determining whether a cellphone user is driving.

Another unique feature believed characteristic of the present application is that no matter what vehicle is used, system 201 will recognize the driver. It is also known in the art that driver is always in the top left side of the vehicle whichever the vehicle is, e.g. car, bus, train and etc.

In a contemplated embodiment, system 201 includes a vehicle 203 and a multi-directional antenna (not shown) embedded in the smartphone that interacts with signals 209 of a second cellphone at points A and B. Further, since point C is the only signal on the left-hand quadrant that does not overlap with any other signal emitted by a second cell phone, it is assumed that's the driver's phone. Finally, driver signal 207 is detected using signal processing capabilities and micro-computing and thereafter disabling the smartphone's functionalities. It will be appreciated that alternative embodiments could include different size vehicles, e.g. buses, trains, vans and etc. in lieu of the contemplated embodiment.

Figure 3:
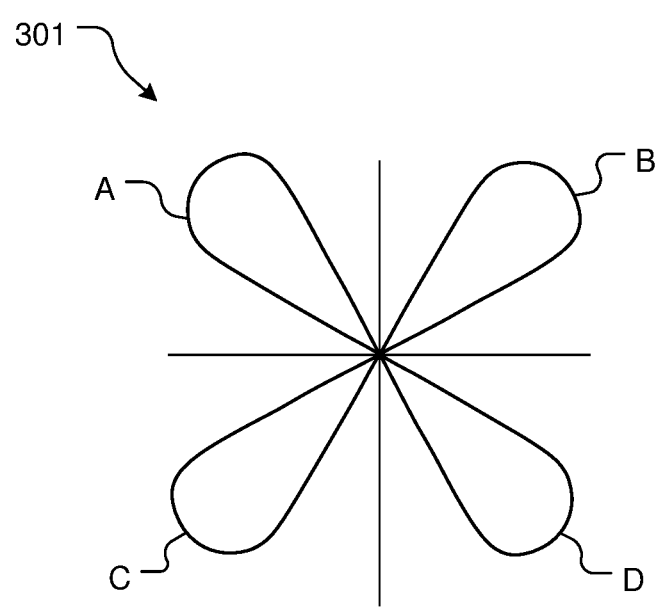
FIG. 3 is an illustration of a multi-directional antenna array.

As shown in FIG. 3, the antenna array 301 would be arranged in an angular fashion emitting signals identified as A, B, C and D. It is contemplated that the more antennas used, the better reading of the direction of the antenna. It is also contemplated that smartphones have embedded gyroscope and compass to recognize the phone's orientation and signals' directions.

In an alternative embodiment, a crowd could be the system itself. Through the antenna utilized in the smartphone, one can detect the length of the crowd by figuring out the driver which is the first person in the crowd.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to determine a driver of a vehicle having a left hand steering wheel, the method comprising:
   providing a first cell phone with a first transceiver to a first user;
   providing a second cell phone with a second transceiver to a second user;
   emitting a first multidirectional signal having four defined quadrants within a predetermined distance with the first cell phone via the first transceiver;
   emitting a second multidirectional signal having four defined quadrants within a predetermined distance with the second cell phone via the second transceiver;
   assigning a reference indicator to each quadrant of the first multidirectional signal and each quadrant of the second multidirectional signal;
   determining which quadrants of the first multidirectional signal overlap with which quadrants of the second multidirectional signal;
   determining which reference indicator is associated with a top left quadrant of the first multidirectional signal;
   determining which reference indicator is associated with a top left quadrant of the second multidirectional signal; and
   determining a driver based upon which top left quadrant does not overlap with any other quadrant.

* * * * *